(12) United States Patent
Ahn

(10) Patent No.: US 7,956,911 B2
(45) Date of Patent: Jun. 7, 2011

(54) DIGITAL PHOTOGRAPHING APPARATUS, AND METHOD AND PROGRAM FOR CONTROLLING THE SAME

(75) Inventor: Eun-sun Ahn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 12/284,101

(22) Filed: Sep. 18, 2008

(65) Prior Publication Data

US 2009/0086053 A1 Apr. 2, 2009

(30) Foreign Application Priority Data

Sep. 28, 2007 (KR) ........................ 10-2007-0098391

(51) Int. Cl.
*H04N 5/208* (2006.01)
*H04N 5/232* (2006.01)

(52) U.S. Cl. ........................................ 348/252; 348/345

(58) Field of Classification Search .................. 348/252, 348/345; 382/199, 266
See application file for complete search history.

(56) References Cited

FOREIGN PATENT DOCUMENTS

KR 1020060035271 A 4/2006

*Primary Examiner* — James M Hannett
(74) *Attorney, Agent, or Firm* — Drinker Biddle & Reath LLP

(57) ABSTRACT

A digital photographing apparatus capable of obtaining an image in which a distant subject is clearly represented and a near subject is naturally represented, and a method and program for controlling the same. The digital photographing apparatus includes a range determiner for determining a distance between the digital photographing apparatus and a main subject, an image pickup element for generating image data from incident light, an edge data acquisition unit for obtaining edge data in different degrees of extraction of the edge data based on the distance between the digital photographing apparatus and the main subject which is determined by the range determiner, when obtaining the edge data on edges of a subject from the image data, and an image data modifier for modifying the image data based on the edge data obtained by the edge data acquisition unit.

25 Claims, 14 Drawing Sheets

FIG. 8E

Edgelm

| $P'_{1,1}$ | $P'_{1,2}$ | $P'_{1,3}$ | $P'_{1,4}$ | $P'_{1,5}$ | $P'_{1,6}$ | $P'_{1,7}$ | $P'_{1,8}$ | $P'_{1,9}$ | $P'_{1,10}$ |
|---|---|---|---|---|---|---|---|---|---|
| $P'_{2,1}$ | $P'_{2,2}$ | $P'_{2,3}$ | $P'_{2,4}$ | $P'_{2,5}$ | $P'_{2,6}$ | $P'_{2,7}$ | $P'_{2,8}$ | $P'_{2,9}$ | $P'_{2,10}$ |
| $P'_{3,1}$ | $P'_{3,2}$ | $P'_{3,3}$ | $P'_{3,4}$ | $P'_{3,5}$ | $P'_{3,6}$ | $P'_{3,7}$ | $P'_{3,8}$ | $P'_{3,9}$ | $P'_{3,10}$ |
| $P'_{4,1}$ | $P'_{4,2}$ | $P'_{4,3}$ | $P'_{4,4}$ | $P'_{4,5}$ | $P'_{4,6}$ | $P'_{4,7}$ | $P'_{4,8}$ | $P'_{4,9}$ | $P'_{4,10}$ |
| $P'_{5,1}$ | $P'_{5,2}$ | $P'_{5,3}$ | $P'_{5,4}$ | $P'_{5,5}$ | $P'_{5,6}$ | $P'_{5,7}$ | $P'_{5,8}$ | $P'_{5,9}$ | $P'_{5,10}$ |
| $P'_{6,1}$ | $P'_{6,2}$ | $P'_{6,3}$ | $P'_{6,4}$ | $P'_{6,5}$ | $P'_{6,6}$ | $P'_{6,7}$ | $P'_{6,8}$ | $P'_{6,9}$ | $P'_{6,10}$ |
| $P'_{7,1}$ | $P'_{7,2}$ | $P'_{7,3}$ | $P'_{7,4}$ | $P'_{7,5}$ | $P'_{7,6}$ | $P'_{7,7}$ | $P'_{7,8}$ | $P'_{7,9}$ | $P'_{7,10}$ |
| $P'_{8,1}$ | $P'_{8,2}$ | $P'_{8,3}$ | $P'_{8,4}$ | $P'_{8,5}$ | $P'_{8,6}$ | $P'_{8,7}$ | $P'_{8,8}$ | $P'_{8,9}$ | $P'_{8,10}$ |
| $P'_{9,1}$ | $P'_{9,2}$ | $P'_{9,3}$ | $P'_{9,4}$ | $P'_{9,5}$ | $P'_{9,6}$ | $P'_{9,7}$ | $P'_{9,8}$ | $P'_{9,9}$ | $P'_{9,10}$ |
| $P'_{10,1}$ | $P'_{10,2}$ | $P'_{10,3}$ | $P'_{10,4}$ | $P'_{10,5}$ | $P'_{10,6}$ | $P'_{10,7}$ | $P'_{10,8}$ | $P'_{10,9}$ | $P'_{10,10}$ |

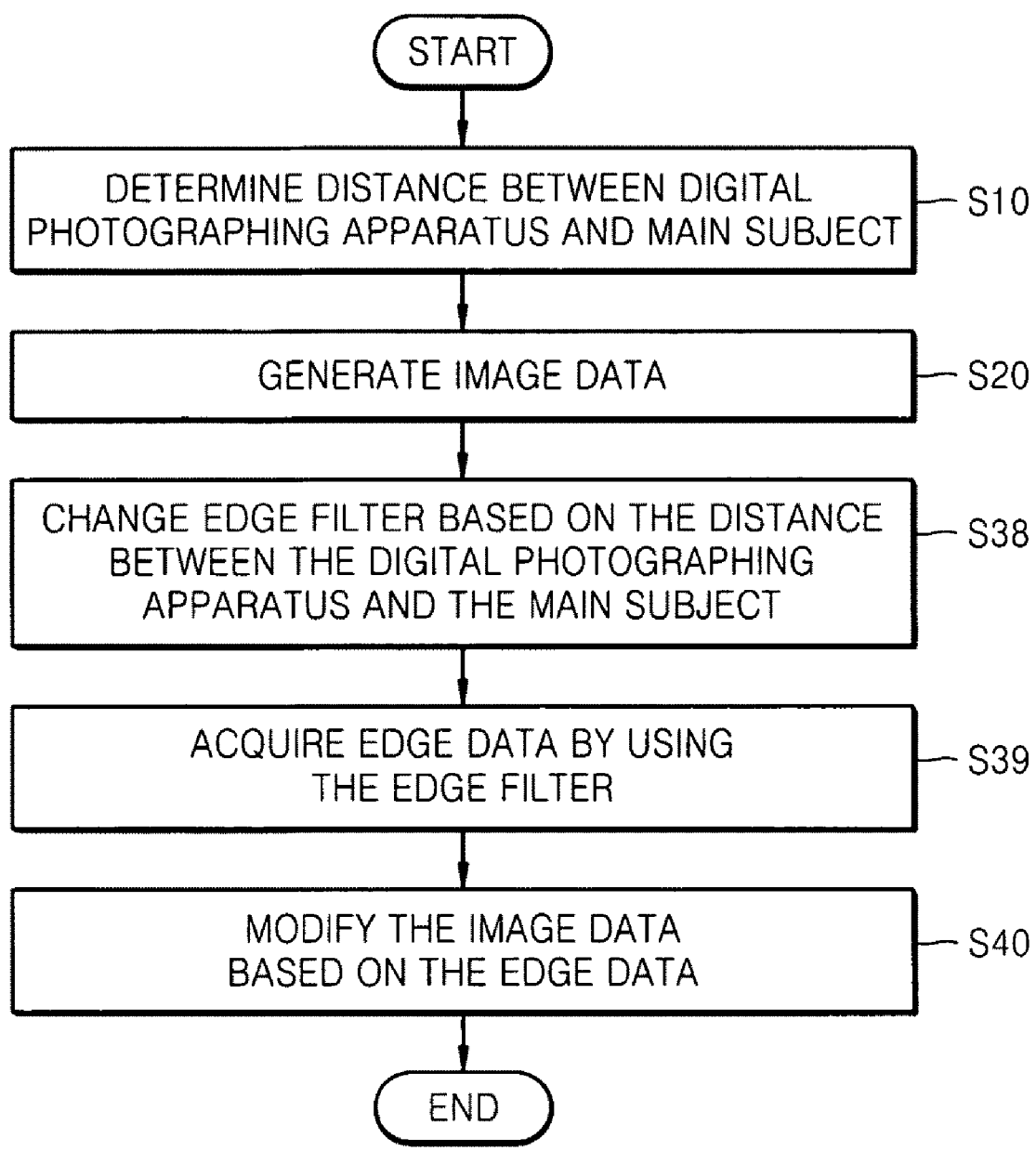

DIGITAL PHOTOGRAPHING APPARATUS, AND METHOD AND PROGRAM FOR CONTROLLING THE SAME

CROSS-REFERENCE TO RELATED PATENT APPLICATION

This application claims the benefit of Korean Patent Application No. 10-2007-0098391, filed on Sep. 28, 2007, in the Korean Intellectual Property Office, the content of which is incorporated herein in its entirety by reference.

BACKGROUND OF THE INVENTION

1. Field of the Invention:

The present invention relates to a digital photographing apparatus, and a method and program for controlling the same. More particularly, the present invention relates to a digital photographing apparatus capable of obtaining an image in which a distant subject is clearly represented and a near subject is naturally represented, and a method and program for controlling the same.

2. Description of the Related Art:

In general, a digital photographing apparatus stores an image file obtained through a photographing operation in a photographing mode in a storage medium, reproduces the image file stored in the storage medium in a playback mode, and displays an image on a display unit. Also, the image file obtained through the photographing operation in the photographing mode may be reproduced.

When photographing by using the digital photographing apparatus, a conventional digital photographing apparatus always processes image data obtained by an image pickup element in the same manner regardless of a distance between the digital photographing apparatus and a main subject. Accordingly, the sharpness or naturalness of the obtained image may not adequate, as the distance between the digital photographing apparatus and the main subject is changed.

SUMMARY OF THE INVENTION

The present invention provides a digital photographing apparatus capable of obtaining an image in which a distant subject is clearly represented and a near subject is naturally represented, and a method and program for controlling the same. According to the embodiments of the present invention described herein, it is possible to obtain an image in which a distant subject is clearly represented and a near subject is naturally represented.

Accordingly, an embodiment of the present invention provides a method of controlling a digital photographing apparatus. The method includes the steps of (a) determining a distance between the digital photographing apparatus and a main subject, (b) generating image data from light incident on an image pickup element of the digital photographing apparatus, (c) obtaining edge data in different degrees of extraction of the edge data based on a distance between the digital photographing apparatus and the main subject, with the edge data being data on edges of a subject from the image data, and (d) modifying the image data based on the edge data. The main subject may be an object on which the digital photographing apparatus focuses.

Step (a) may be performed by using autofocusing data of an autofocusing lens of the digital photographing apparatus. Alternatively, step (a) may be performed by using data from a range finder for measuring the distance between the digital photographing apparatus and the main subject, and the range finder may be attached to the digital photographing apparatus.

In step (c), the edge data may be obtained in a high degree of extraction of the edge data, as the distance between the digital photographing apparatus and the main subject increases. Also, in step (c), the edge data may be obtained, so that a number of pixels corresponding to the edges in the extracted edge data increases, as the distance between the digital photographing apparatus and the main subject increases.

Furthermore, in step (c), the edge data may be obtained, so that the number of pixels with high luminance in the extracted edge data increases, as the distance between the digital photographing apparatus and the main subject increases. Additionally, in step (c), the edge data may be obtained, so that pixels are recognized as the edges, even though a luminance difference between neighboring pixels is small, as the distance between the digital photographing apparatus and the main subject increases. Also, in step (c) the edge data may be obtained, so that pixels have high luminance in the extracted edge data, even though a luminance difference between neighboring pixels in the image data is small, as the distance between the digital photographing apparatus and the main subject increases.

In step (d), data corresponding to the edges in the image data may be modified. The edge data may include luminance information, and in step (d), with regard to each pixel, the luminance information of the edge data may be added to luminance information of the image data.

In addition, the edge data may include luminance information, and, with regard to each pixel, step (d) may include a step (d-1) of changing the luminance information of the image data into a value obtained by adding the luminance information of the edge data to the luminance information of the image data, when the value obtained by adding the luminance information of the edge data to the luminance information of the image data is equal to or less than a maximum luminance value. Step (d) may also include a step (d-2) of changing the luminance information of the image data into the maximum luminance value, when the value obtained by adding the luminance information of the edge data to the luminance information of the image data is greater than the maximum luminance value.

Another embodiment of the present invention provides a computer-readable recording medium having embodied thereon a computer program for executing the method of controlling a digital photographing apparatus. A further embodiment of the present invention provides a digital photographing apparatus including a range determiner for determining a distance between the digital photographing apparatus and a main subject, an image pickup element generating image data from incident light, an edge data acquisition unit for obtaining edge data in different degrees of extraction of the edge data based on the distance between the digital photographing apparatus and the main subject which is determined by the range determiner, with the edge data being data on edges of a subject from the image data, and an image data modifier for modifying the image data based on the edge data obtained by the edge data acquisition unit. The main subject may be an object on which the digital photographing apparatus focuses. The range determiner may determine the distance between the digital photographing apparatus and the main subject by using autofocusing data of an autofocusing lens of the digital photographing apparatus.

The digital photographing apparatus may further include a range finder for measuring the distance between the digital photographing apparatus and the main subject, and the range determiner may determine the distance between the digital photographing apparatus and the main subject by using data from the range finder.

The edge data acquisition unit may obtain the edge data in a high degree of extraction of the edge data, as the distance between the digital photographing apparatus and the main subject increases. The edge data acquisition unit may obtain the edge data in a specified degree of extraction of the edge data or in a higher degree of extraction of the edge data than the specified degree of extraction of the edge data, as the distance between the digital photographing apparatus and the main subject increases. Also, the edge data acquisition unit may obtain the edge data, so that the number of pixels corresponding to the edges in the extracted edge data increases, as the distance between the digital photographing apparatus and the main subject increases. In addition, the edge data acquisition unit may obtain the edge data, so that the number of pixels with high luminance in the extracted edge data increases, as the distance between the digital photographing apparatus and the main subject increases.

The edge data acquisition unit may further obtain the edge data, so that pixels are recognized as the edges, even though a luminance difference between neighboring pixels is small, as the distance between the digital photographing apparatus and the main subject increases. The edge data acquisition unit may obtain the edge data, so that pixels have high luminance in the extracted edge data, even though a luminance difference between neighboring pixels in the image data is small, as the distance between the digital photographing apparatus and the main subject increases.

The image data modifier may modify data corresponding to the edges in the image data. The edge data may include luminance information, and the image data modifier may add the luminance information of the edge data to luminance information of the image data, in regard to each pixel. Also, the edge data may include luminance information, and, in regard to each pixel, the image data modifier may change the luminance information of the image data into a value obtained by adding the luminance information of the edge data to the luminance information of the image data, when the value obtained by adding the luminance information of the edge data to the luminance information of the image data is equal to or less than a maximum luminance value, and, in regard to each pixel, the image data modifier may change the luminance information of the image data into the maximum luminance value, when the value obtained by adding the luminance information of the edge data to the luminance information of the image data is greater than the maximum luminance value.

BRIEF DESCRIPTION OF THE DRAWINGS

The above and other features and advantages of the present invention will become more apparent by describing in detail exemplary embodiments thereof with reference to the attached drawings in which:

FIG. 8E schematically illustrates an example of a structure of an edge image obtained from the image of FIG. 8A;

FIG. 11 is a flowchart of an example of a method of controlling a digital photographing apparatus according to another embodiment of the present invention.

DETAILED DESCRIPTION OF THE EMBODIMENTS

Embodiments of the present invention will be described in detail with reference to the attached drawings.

Figure 1:
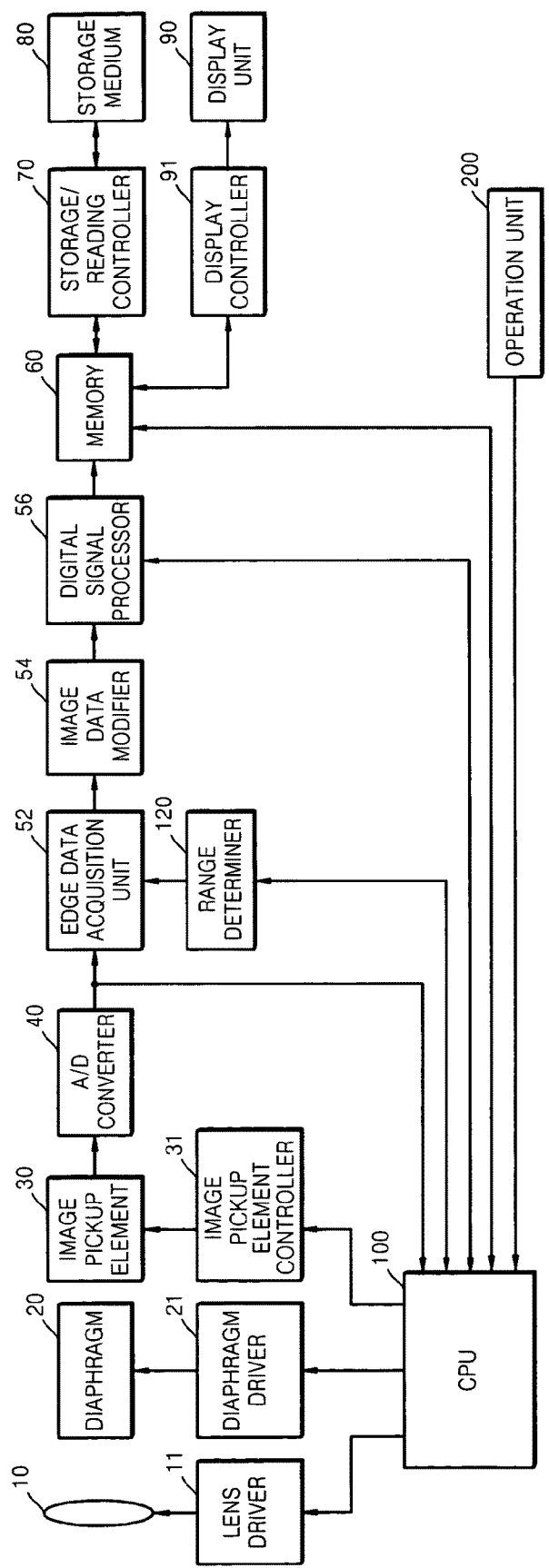
FIG. 1 is a block diagram schematically illustrating an example of a digital photographing apparatus according to an embodiment of the present invention.

FIG. 1 is a block diagram schematically illustrating an example of a digital photographing apparatus according to an embodiment of the present invention. In this example, the operations of the digital photographing apparatus are controlled by a central processing unit (CPU) 100. The digital photographing apparatus includes an operation unit 200 having a key for generating an electrical signal input by a user. The electrical signal is transmitted from the operation unit 200 to the CPU 100. The CPU 100 controls the digital photographing apparatus based on the electrical signal.

In a photographing mode, when the electrical signal is applied from a user to the CPU 100, the CPU 100 controls a lens driver 11, a diaphragm driver 21, and an image pickup element controller 31, by recognizing the signal. Accordingly, a position of a lens 10, an opening degree of a diaphragm 20, and a sensitivity of an image pickup element 30 are also controlled. A range determiner 120 determines a distance between the digital photographing apparatus and a main subject. The range determiner 120 may use data on a position of the lens 10 for an autofocusing process which is controlled by the lens driver 11 as described later.

The image pickup element 30 generates a data signal of an image (image data) from incident light. When the image data is output from the image pickup element 30, the image data is converted into digital image data by, for example, an analog/digital converter (A/D converter) 40 and the converted image data is input into the CPU 100 and an edge data acquisition unit 52.

The edge data acquisition unit 52 obtains edge data on edges of the subject from the image data. At this time, the edge data acquisition unit 52 obtains the edge data by changing an extraction amount of the edge data based on the distance between the digital photographing apparatus and the main subject which is determined by the range determiner 120 and transmits the edge data to an image data modifier 54. The image data modifier 54 modifies the image data based on the edge data acquired by the edge data acquisition unit 52. The modified image data output from the image data modifier 54 is input into a digital signal processor 56. The digital signal processor 56 performs a digital signal processing operation such as gamma correction, white balance control, or the like.

Although the digital photographing apparatus of FIG. 1 includes the edge data acquisition unit 52, the image data modifier 54, and the digital signal processor 56, this is only an exemplary embodiment and various changes may be made thereto. For example, the edge data acquisition unit 52 and the image data modifier 54 may be a part of the digital signal processor 56. Furthermore, the edge data acquisition unit 52 and the image data modifier 54 may be a part of the CPU 100. In addition, a flow direction of the electrical signal (data) and the transmission relationship shown in FIG. 1 are only examples and various changes may be made to the manner in which signals flow and data is transmitted.

The image data that is output from the digital signal processor 56 is transmitted to a display controller 91 through a memory 60 or directly transmitted to the display controller 91. Here, the memory may be a read-only memory (ROM) or a random-access memory (RAM). The display controller 91 controls a display unit 90 to display an image on the display unit 90. The image data that is output from the digital signal processor 50 may be input into a storage/reading controller 70. The storage/reading controller 70 stores the image data in a storage medium 80 in response to a signal from a user or automatically stores the image data in the storage medium 80. The storage/reading controller 70 reads the image data from an image file stored in the storage medium 80, inputs the image data into the display controller 91 through the memory 60, and allows the image to be displayed on the display unit 90.

As described above, in the case of the conventional digital photographing apparatus, image data obtained by the image pickup element is processed in the same manner regardless of the distance between the digital photographing apparatus and the main subject. Accordingly, sharpness or naturalness of the obtained image is not adequate, as the distance between the digital photographing apparatus and main subjects can change.

However, in the case of the digital photographing apparatus according to the current embodiment, a range determiner 120 determines a distance between the digital photographing apparatus and the main subject. The edge data acquisition unit 52 obtains the edge data on the edges of the subject by changing the extraction amount of the edge data from the image data based on the distance between the digital photographing apparatus and the main subject, which is determined by the range determiner 120, and transmits the obtained edge data to the data modifier 54. The image data modifier 54 modifies the image data based on the edge data acquired by the edge data acquisition unit 52. That is, in the case of the digital photographing apparatus, the image data obtained by the image pickup element based on the distance between the digital photographing device and the main subject is processed in different ways. Accordingly, although the distance between the digital photographing apparatus and the main subject is changed, it is possible to always obtain a clear and natural image.

For example, in order to improve the sharpness of the photographed image, the edge data on the edges of the subject is extracted from the image data. The image data can be modified based on the extracted edge data. In general, when the digital photographing apparatus is far from the main subject, the sharpness of the image tends to deteriorate. Accordingly, in a case where the digital photographing apparatus is far from the main subject, more edge data is extracted from the image data. It is possible to improve the sharpness of the image by modifying the image data based on the extracted edge data.

However, when an image processing method for improving the sharpness of the image in a case where the digital photographing apparatus is far from the main subject is employed, the naturalness of the image in a case where the digital photographing apparatus is close to the main subject may deteriorate. That is, when the digital photographing apparatus is close to the main subject, the size of the subject in the image becomes large, and a highlighted part of the subject is largely displayed in the image. In this case, the more edge data that is extracted from the image data, the more parts of the image are emphasized as highlighted parts. Accordingly, the naturalness of the entire image deteriorates. This is because the edge data may intentionally or unintentionally include data on highlighted parts or other parts, in addition to data corresponding to accurate edges of the subject. On the contrary, when the naturalness of the image is improved in a case where the digital photographing apparatus is close to the main subject, the sharpness of the image deteriorates in a case where the digital photographing apparatus is far from the main subject, if the image data are processed in the same manner in both cases.

However, in the case of the digital photographing apparatus according to the current embodiment, it is possible to obtain a natural image with a high degree of sharpness by processing image data obtained by the image pickup element in different ways based on the distance between the digital photographing apparatus and the main subject, even when the distance between the digital photographing apparatus and the main subject is changed.

The range determiner 120 for determining the distance between the digital photographing apparatus and the main subject can determine the distance between the digital photographing apparatus and the main subject. For example, it is possible to determine the distance between the digital photographing apparatus and the main subject by using autofocusing data of the autofocusing lens 10 of the digital photographing apparatus. This will be described with reference to FIGS. 2A to 2C.

Figure 2A:
FIG. 2A illustrates an image obtained by using the digital photographing apparatus of FIG. 1.
Figure 2B:
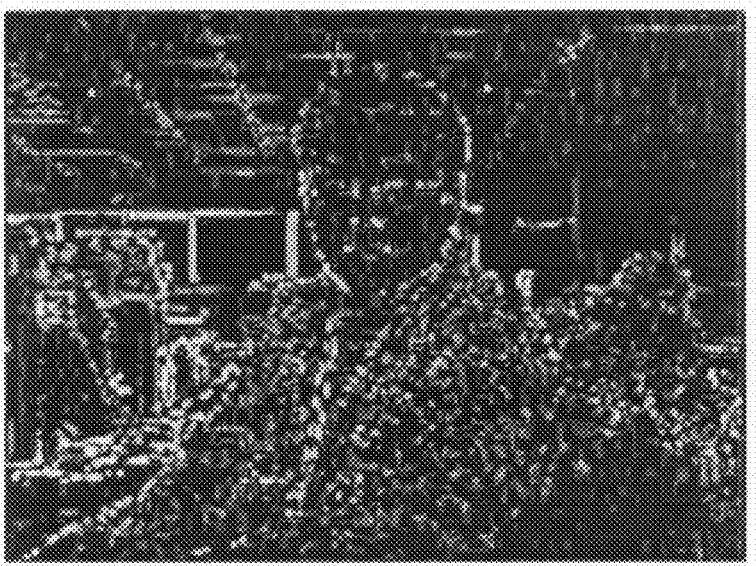
FIG. 2B illustrates an example of an edge image of the image of FIG. 2A.
Figure 2C:
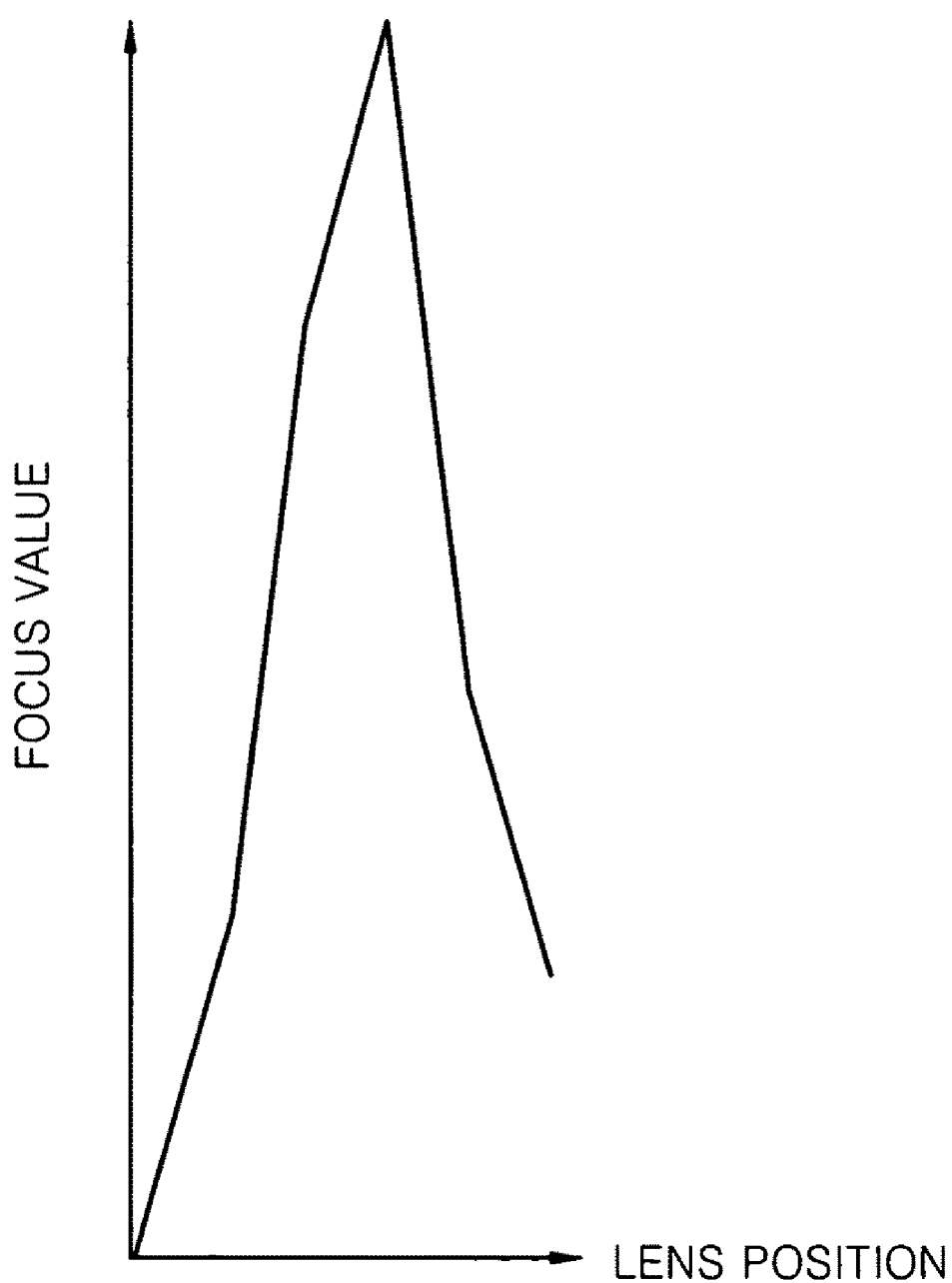
FIG. 2C is an example of a graph used to determine a lens position for an autofocusing process.

FIG. 2A illustrates an example of an image obtained by using the digital photographing apparatus of FIG. 1. FIG. 2B illustrates an example of an edge image of the image of FIG. 2A. FIG. 2C is an example of a graph used to determine a lens position for an autofocusing process. In FIGS. 2A to 2C, the image does not indicate a final image taken by the digital photographing apparatus but indicates an image obtained by the image pickup element 30 (see FIG. 1) before taking a photograph. In addition, the edge image does not indicate an image in which only the edges of the subject are accurately displayed but indicates an image in which only the entire outlines of the subject is displayed. The edge image is obtained as described below. The following description is only an exemplary embodiment and various changes may be made to the configuration and operation.

First, an image is transformed into a black-and-white image. When a difference between a luminance value of a pixel and a luminance value of a neighboring pixel is equal to or greater than a predetermined value, for example, 3% or about 3%, a value of 1 is allocated to the pixel. When the difference is less than the predetermined value, a value of 0 is allocated to the pixel. Since each pixel of the image has luminance data, the image may not be transformed into the black-and-white image but processed by using the luminance data of the image. Various changes may be made. After all the pixels of the image have a value of 1 or 0 through the aforementioned process, when pixels having the value of 1 are brightly displayed and when pixels having the value of 0 are darkly displayed, the edge image shown in FIG. 2B is obtained. Various other methods may also be applied. When a difference between a luminance value of a pixel and a luminance value of a predetermined pixel is equal to or greater than a predetermined value, for example, 3% or about 3%, a value of 1 is allocated to the pixel. When the difference is less than the predetermined value, a value of 0 is allocated to the pixel. Accordingly, the edge image may be obtained. Various methods of obtaining the edge image are shown with reference to FIGS. 8A to 8D and various changes may be made thereto.

On the other hand, after the edge image is obtained at each position of the lens 10 (see FIG. 1) by slightly moving the position of the lens 10 (refer to FIG. 1), autofocusing data is obtained from the edge images. Here, the lens 10 may be a lens system including a plurality of lenses or a lens included in a lens system including a plurality of lenses. In the edge image obtained at a predetermined position of the lens, the number of pixels having the value of 1 is a focus value. Data on a change of the focus value based on the position change of the lens is autofocusing data. Here, the main subject indicates a subject on which the digital photographing apparatus focuses (a subject in an area on which the digital photographing apparatus focuses). In FIGS. 2A and 2B, the main subject may be a face of a man.

In the edge image obtained at the position of each lens, after the number of pixels having the value of 1 in the area of the main subject is counted, a graph is obtained as shown in FIG. 2C, of which horizontal and longitudinal axes represent the position of the lens and the number of the counted pixels, respectively. The position of the lens corresponding to the peak of the graph indicates the position of the lens at which the digital photographing apparatus is focused. FIG. 2C shows a focus value of the face in the edge image of FIG. 2B. The focus value of the face according to the peak in this example is 34483. The lowest end of the longitudinal axis of FIG. 2C is not 0. For convenience of illustration, the lower part of the graph is omitted. As shown in FIG. 2C, the graph is based on the autofocusing data.

The autofocusing process is carried out by performing the aforementioned method. The autofocusing data obtained through the aforementioned method may be analyzed as data for adjusting the position of the lens based on the distance between the digital photographing apparatus and the main subject. Accordingly, since the autofocusing data indicates data on the distance between the digital photographing apparatus and the main subject, the range determiner 120 for determining a distance between the digital photographing apparatus and the main subject can determine the distance between the digital photographing apparatus and the main subject by using the autofocusing data of the autofocusing lens 10.

Figure 3:
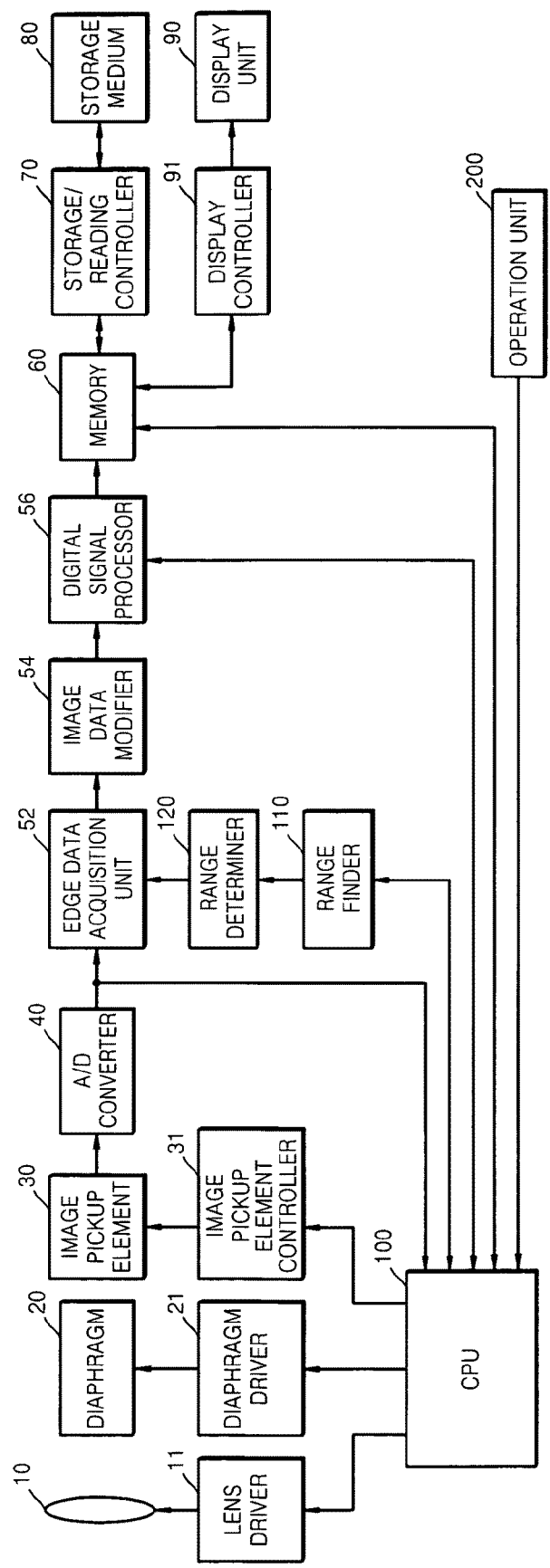
FIG. 3 is a block diagram schematically illustrating an example of a digital photographing apparatus according to another embodiment of the present invention.

The digital photographing apparatus according to another embodiment of the present invention schematically shown in FIG. 3 may further include a range finder 110 for measuring the distance between the digital photographing apparatus and the main subject. Then, the range determiner 120 determines the distance between the digital photographing apparatus and the main subject by using the data from the range finder 110. The range finder 110 can measure the distance between the digital photographing apparatus and the main subject by using an infrared ray sensor, or the like.

As described above, in the digital photographing apparatus according to an embodiment of the present invention, the range determiner 120 determines the distance between the digital photographing apparatus and the main subject. The edge data acquisition unit 52 obtains the edge data on edges of the subject from the image data in different degrees of extraction of the edge data based on the distance between the digital photographing apparatus and the main subject, which is determined by the range determiner 120, and transmits the obtained edge data to the data modifier 54. The image data modifier 54 modifies the image data based on the edge data acquired by the edge data acquisition unit 52. Hereinafter, an acquisition process of the edge data acquisition unit 52 in different degrees of extraction of the edge data based on the distance between the digital photographing apparatus and the main subject, which is determined by the range determiner 120, will be described.

Figure 4A:
FIG. 4A illustrates an example of a final image of a distant subject obtained by modifying image data based on edge data acquired by extracting a large amount of the edge data from image data.
Figure 4B:
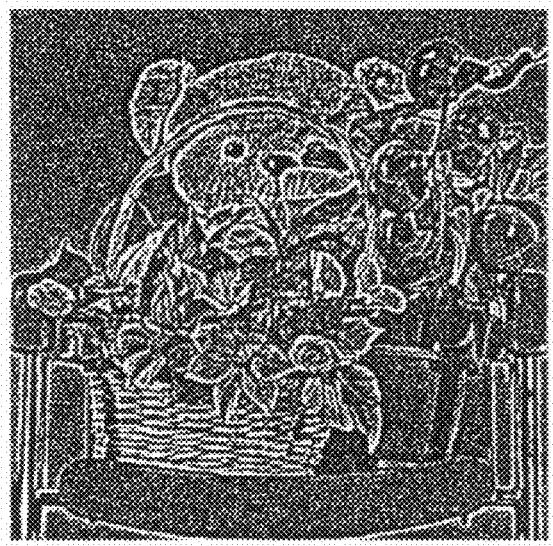
FIG. 4B illustrates an example of an edge image in a process of FIG. 4A.
Figure 5A:
FIG. 5A illustrates an example of a final image of a distant subject obtained by modifying image data based on edge data acquired by extracting a small amount of the edge data from image data.
Figure 5B:
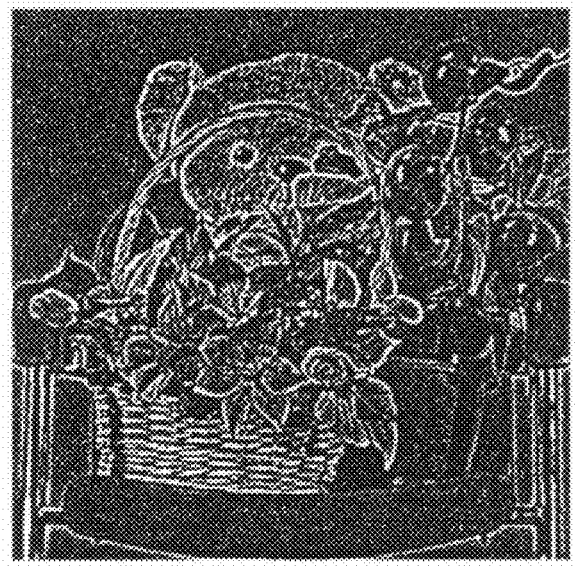
FIG. 5B illustrates an example of an edge image in a process of FIG. 5A.

FIG. 4A illustrates an example of a final image of a distant subject obtained by modifying original image data based on edge data acquired from the original image data in a high degree of extraction of the edge data. FIG. 4B illustrates an example of an edge image in a process of FIG. 4A. FIG. 5A illustrates an example of a final image obtained by processing, in a different way, the original image that is the same as the original image of FIG. 4A. The final image is obtained by modifying original image data based on edge data acquired from the original image data in a low degree of extraction of the edge data. FIG. 5B illustrates an example of an edge image in a process of FIG. 5A. The distance between the digital photographing apparatus and the main subject may be considered to be short in consideration of the size of the main subject of FIGS. 4A and 5A, since the images of FIGS. 4A and 5A are not the entire images but cropped images. In practice, the images of FIGS. 4A and 5A are obtained in a case where the digital photographing apparatus is far from the main subject.

Referring to FIGS. 4B and 5B, the number of pixels brightly displayed in FIG. 4B is greater than that of pixels brightly displayed in FIG. 5B. That is, acquisition of the edge data by extracting a large amount of the edge data from the original image data indicates that the number of pixels brightly displayed in the edge image is increased. The edge image of FIG. 4B includes more information on the edges of the subjects in the original image than that of FIG. 5B. Accordingly, the sharpness of the final image of the subject in a case where the original image data is modified by using the edge data of FIG. 4B is higher than that of the final image of the subject in a case where the original image data is modified by using the edge data of FIG. 5B. This is because the sharpness of the image of the subject is in relation to the amount of data on the edges of the subject. A method of modifying the original image data by using the edge data will be described later. In practice, the image of FIG. 4A is clearer than the image of FIG. 5A.

Accordingly, unlike the conventional digital photographing apparatus, in the case of the digital photographing apparatus according to this embodiment, the edge data acquisition unit acquires the edge data in a higher degree of extraction of the edge data, as the distance between the digital photographing apparatus and the main subject increases. Alternatively, the edge data acquisition unit acquires edge data, so that the number of pixels corresponding to the edges in the extracted edge data increases. This indicates that the amount of the data on the edges of the subject increases, as the distance between the digital photographing apparatus and the main subject increases. On the other hand, although a case where all the pixels in the aforementioned edge image have a value of 1 or 0 is described with reference to FIG. 2B, as described below with reference to FIGS. 8A to 8D, the pixels of the edge image may have various luminance values of 0 to 255, or any values within or about that range. Accordingly, in this case, the edge data acquisition unit may acquire the edge data, so that the number of pixels having high luminance in the extracted edge data increases, as the distance between the digital photographing apparatus and the main subject increases. Alternatively, although a luminance difference between neighboring pixels is small, the edge data acquisition unit acquires the edge data so as to recognize the pixels as the edges of the subject, as the distance between the digital photographing apparatus and the main subject increases. Accordingly, the amount of data on the edges of the subject may increase. In addition, although the luminance difference between neighboring pixels in the image data is small, the edge data acquisition unit acquires the edge data, so that the pixels have high luminance in the extracted edge data, as the distance between the digital photographing apparatus and the main subject increases. Accordingly, the amount of data on the edges of the subject may increase.

Figure 6A:
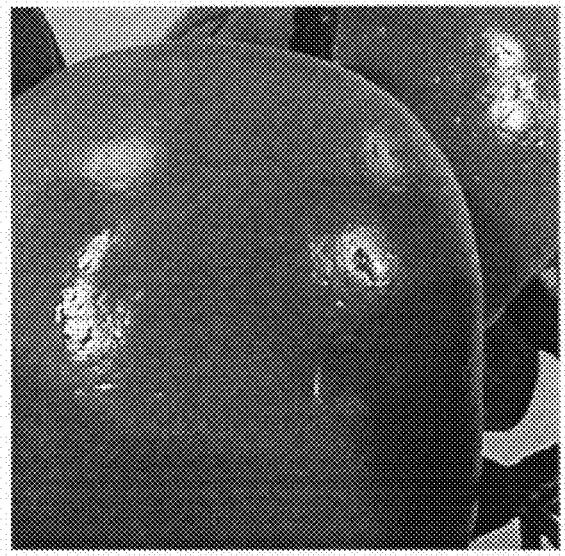
FIG. 6A illustrates an example of a final image of a near subject obtained by modifying image data based on edge data acquired by extracting a large amount of the edge data from image data.
Figure 6B:
FIG. 6B illustrates an example of an edge image in a process of FIG. 6A.
Figure 7A:
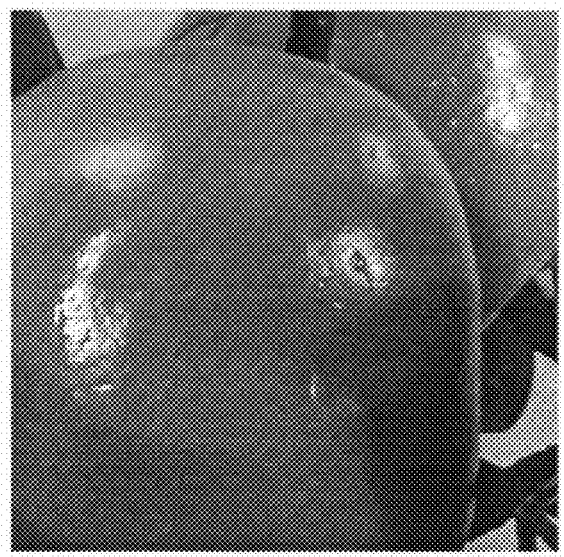
FIG. 7A illustrates an example of a final image of a near subject obtained by modifying image data based on edge data acquired by extracting a small amount of the edge data from image data.
Figure 7B:
FIG. 7B illustrates an example of an edge image in a process of FIG. 7A.

FIG. 6A illustrates an example of a final image of a near subject obtained by modifying original image data based on edge data acquired from the original image data in a high degree of extraction of the edge data. FIG. 6B illustrates an example of an edge image in a process of FIG. 6A. FIG. 7A illustrates an example of a final image of a near subject obtained by processing, in a different way, the original image data that is the same as the original image of FIG. 6A. The final image is obtained by modifying original image data based on edge data acquired from the original image data in a low degree of extraction of the edge data. FIG. 7B illustrates an example of an edge image in a process of FIG. 7A.

Referring to FIGS. 6B and 7B, the number of pixels brightly displayed in FIG. 6B is greater than that of pixels brightly displayed in FIG. 7B. That is, acquiring the edge data from the original image data in a high degree of extraction of the edge data represents that the number of pixels brightly displayed in the edge image increases. However, when the digital photographing apparatus is close to the main subject, as shown in FIGS. 6A and 7A, the size of the subject becomes large, and a highlighted part of the subject is largely displayed in the image. This is because the edge data may include data on highlighted parts or other parts, in addition to data corresponding to accurate edges of the subject.

In this case, the more edge data that is extracted from the image data, the more parts of the image are emphasized as the highlighted parts. Accordingly, the naturalness of the entire image deteriorates. When the highlighted parts increase, information on colors is relatively decreased or not recognized by an observer. Accordingly, the final image in a case where the original image data is modified by using the edge data of FIG. 7B is more natural than the final image in a case where the original image data is modified by using the edge data of FIG. 6B. In practice, the image of FIG. 7A is more natural than the image of FIG. 6A. For example, although the surface of the highlighted part of the subject is smooth, more scratches are represented in the image of FIG. 6A compared to in the image of FIG. 7A.

Accordingly, unlike the conventional digital photographing apparatus, in the case of the digital photographing apparatus according to an embodiment of the present invention, the edge data acquisition unit can obtain the final image of the subject with high sharpness when the digital photographing apparatus is far from the main subject and obtain the natural final image of the subject when the digital photographing apparatus is close to the main subject, in consideration of the distance between the digital photographing apparatus and the main subject. That is, in the case of the digital photographing apparatus according to an embodiment of the present invention, it is possible to obtain a natural image with high sharpness by processing image data obtained by the image pickup element, in a different way, based on the distance between the digital photographing apparatus and the main subject, even when the distance between the digital photographing apparatus and the main subject is changed.

The edge image may be obtained by using various methods. For example, although a case where all the pixels in the aforementioned edge image have a value of 1 or 0 is described with reference to FIG. 2B, as described below, the pixels of the edge image may have various luminance values of 0 to 255 or values within or about that range. This will be described with reference to FIGS. 8A to 8D.

Figure 8A:
FIG. 8A schematically illustrates an example of a structure of an image that is ten pixels wide by ten pixels high.
Figure 8B:
FIG. 8B illustrates an example of an edge filter which is five sub-filters wide by five sub-filters high and is to be used for obtaining the edge images of FIGS. 4B, 5B, 6B, and 7B.

FIG. 8A schematically illustrates an example of a structure of an image Im that is ten pixels wide by ten pixels high. FIG. 8B illustrates an example of an edge filter Filter which is five sub-filters wide by five sub-filters high and is to be used to obtain the edge images of FIGS. 4B, 5B, 6B, and 7B. It is possible to obtain an edge image having the hundred pixels by calculating edge data for the hundred pixels shown in FIG. 8A by using luminance data of the hundred pixels.

Figure 8C:
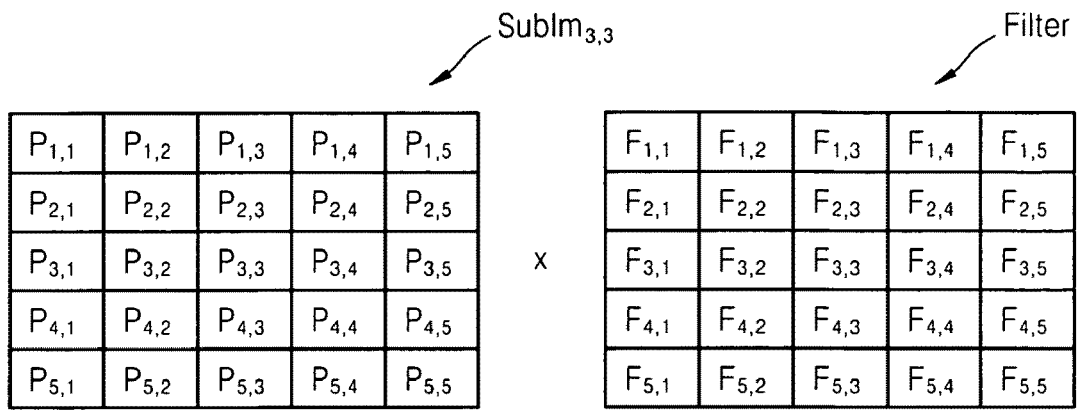
FIG. 8C schematically illustrates an example of a procedure of obtaining edge data of a pixel at a position (3, 3) in one hundred pixels of FIG. 8A, by use of the edge filter of FIG. 8B.

FIG. 8C schematically illustrates a procedure of obtaining edge data of a pixel at a position (3, 3) in one hundred pixels of FIG. 8A. Hereinafter, for convenience of explanation, the luminance value of the pixel at the position (3, 3) is represented by $P_{3,3}$ and the edge data of the pixel at the position (3, 3) is represented by $P'_{3,3}$. In order to obtain the edge data $P'_{3,3}$ of the pixel at the position (3, 3), a sub-image $SubIm_{3,3}$ having a size that is the same as that of the edge filter Filter shown in FIG. 8B is selected with respect to the pixel at the position (3, 3) in the image Im shown in FIG. 8A, as shown in FIG. 8C. The edge data $P'_{3,3}$ of the pixel at the position (3, 3) is obtained by combining the sub-image $SubIm_{3,3}$ with the edge filter Filter. The edge data $P'_{3,3}$ is obtained by using Equation 1 as follows:

$$P'_{3,3} = (P_{1,1} \times F_{1,1}) + (P_{1,2} \times F_{1,2}) + \ldots + (P_{1,5} \times F_{1,5}) + \quad \text{[Equation 1]}$$
$$(P_{2,1} \times F_{2,1}) + (P_{2,2} \times F_{2,2}) + \ldots + (P_{2,5} \times F_{2,5}) +$$
$$(P_{5,1} \times F_{5,1}) + (P_{5,2} \times F_{5,2}) + \ldots + (P_{5,5} \times F_{5,5}),$$

where $F_{i,j}$ is a value of a sub-filter at a position (i, j) and indicates a weight. For example, the value $F_{3,3}$ of a sub-filter at a position (3, 3) corresponding to the center of the edge filters is greater than that of a sub-filter at any other position. As sub-filters at the other positions increase in distance from the sub-filter at the position (3, 3), values of the sub-filters at the other positions decrease. Accordingly, it is possible to determine the edge data $P'_{3,3}$ of the pixel at the position (3, 3) based on a relation between the pixel at the position (3, 3) and a neighboring pixel thereof in the image Im.

Figure 8D:
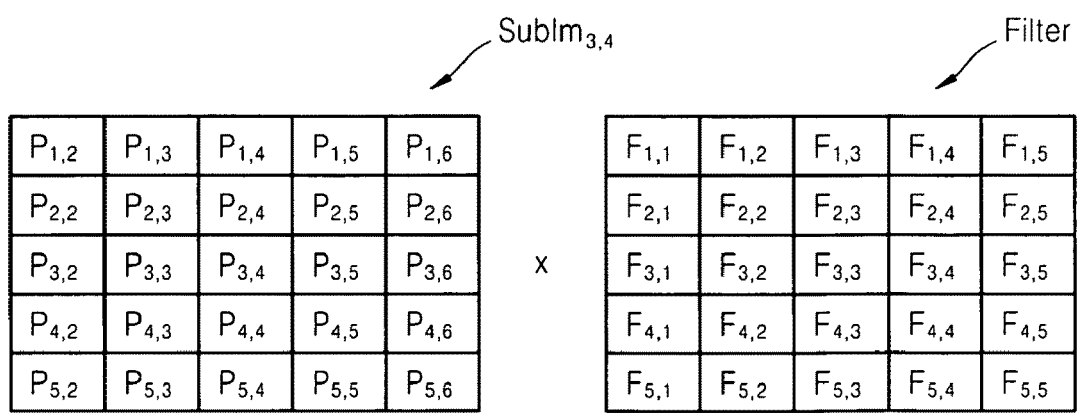
FIG. 8D schematically illustrates an example of a procedure of obtaining edge data of a pixel at a position (3, 4) in the hundred pixels of FIG. 8A, by use of the edge filter of FIG. 8B.

FIG. 8D schematically illustrates an example of a procedure of obtaining edge data of a pixel at a position (3, 4) in the hundred pixels of FIG. 8A. In order to obtain the edge data $P'_{3,4}$ of the pixel at the position (3, 4), a sub-image $SubIm_{3,4}$ having a size that is the same as that of the edge filter Filter shown in FIG. 8B is selected with respect to the pixel at the position (3, 4) in the image Im shown in FIG. 8A, as shown in FIG. 8D. The edge data $P'_{3,4}$ of the pixel at the position (3, 4) is obtained by combining the sub-image $SubIm_{3,4}$ with the edge filter Filter. The edge data $P'_{3,4}$ is obtained by using Equation 2 as follows:

$$P'_{3,4} = (P_{1,2} \times F_{1,1}) + (P_{1,3} \times F_{1,2}) + \ldots + (P_{1,6} \times F_{1,5}) + \quad \text{[Equation 2]}$$
$$(P_{2,2} \times F_{2,1}) + (P_{2,3} \times F_{2,2}) + \ldots + (P_{2,6} \times F_{2,5}) +$$
$$(P_{5,2} \times F_{5,1}) + (P_{5,3} \times F_{5,2}) + \ldots + (P_{5,6} \times F_{5,5}).$$

When edge data is calculated with respect to one hundred pixels of the image Im of FIG. 8A by performing the aforementioned method, it is possible to obtain an edge image EdgeIm as shown in FIG. 8E. The edge images of FIGS. 4B, 5B, 6B, and 7B are obtained by performing the aforementioned method. In the aforementioned method, it is possible to obtain the edge data in different degrees of extraction of the edge data by suitably controlling the combination of values $F_{i,j}$ of sub-filters of the edge filter Filter at the position (i, j). For example, in a case where the edge data $P'_{3,3}$ of the pixel at the position (3, 3) is calculated, when the values $F_{2,2}$, $F_{2,3}$, $F_{2,4}$, $F_{3,2}$, $F_{3,4}$, $F_{4,2}$, $F_{4,3}$ and $F_{4,4}$ of the sub-filters adjacent to the sub-filter at the position (3, 3) are negative, as the absolute values of the values $F_{2,2}$, $F_{2,3}$, $F_{2,4}$, $F_{3,2}$, $F_{3,4}$, $F_{4,2}$, $F_{4,3}$ and $F_{4,4}$ of the sub-filters increase, the value of the edge data $P'_{3,3}$ of the pixel at the position (3, 3) decreases. When the calculation result of Equation 1 is less than zero, the value of edge data $P'_{3,3}$ may be zero. This is because the luminance is equal to or greater than zero. The decrease in the value of the edge data $P'_{3,3}$ of the pixel at the position (3, 3) by controlling the combination of values $F_{i,j}$ of sub-filters of the edge filter Filter indicates that the number of pixels brightly represented in the edge image EdgeIm of FIG. 8E decreases. This indicates that the data extraction degree is low. Accordingly, it is possible to obtain the edge data in different degrees of extraction of the edge data by suitably controlling the combination of the values $F_{i,j}$ of the sub-filters of the edge filter Filter at the position (i, j).

In FIG. 8B, the edge filter Filter is an example. The size and shape of the edge filter is not limited to those shown in FIG. 8B. The method of obtaining the edge data is not limited to the aforementioned method.

On the other hand, since the sharpness of the subject in the final image is in relation to the amount of data on the edges of the subject, a method of obtaining a final image by modifying the original data by using the edge data will be described. The image data modifier 54 of the digital photographing apparatus according to an embodiment of the present invention modifies the image data based on the edge data. At this time, the image data modifier 54 controls the sharpness and naturalness of the subject by modifying data corresponding to the edge data included in the original image data.

Specifically, since the edge data includes luminance information, the image data modifier 54 can add the luminance information of the edge data to luminance information of the original image data in regard to each pixel. Here, in a process of adding the luminance information of the edge data to the luminance information of the original image data in regard to each pixel, when the value obtained by adding the luminance information of the edge data to the luminance information of the original image data is equal to or less than a maximum luminance value, the luminance information of the image data is changed into the value obtained by adding the luminance information of the edge data to the luminance information of the image data, or when the value obtained by adding the luminance information of the edge data to the luminance information of the original image data is greater than the maximum luminance value, the luminance information of the image data is changed into the maximum luminance value. Here, when the luminance of each pixel is represented as 8 bit information, since the luminance of the pixels may have values in a range of 0 to 255 ($=2^8-1$), the maximum luminance value is 255.

The image data modifier 54 modifies the image data based on the edge data. At this time, when the edge data added to the original image data is not the edge data with a low degree of extraction of the edge data shown in FIG. 5B but the edge data with a high degree of extraction of the edge data shown in FIG. 4B, since the edge luminance of the subject in the final image data is emphasized more, the final image of the subject with high sharpness shown in FIG. 4A becomes the final image, instead of the final image of the subject with low sharpness shown in FIG. 5A. Alternatively, when the edge data added to the original image data is not the edge data with a high degree of extraction of the edge data shown in FIG. 6B, but instead is the edge data with a low degree of extraction of the edge data shown in FIG. 7B, since the edge luminance of the subject in the final image data is emphasized less, the natural final image of the subject shown in FIG. 7A becomes the final image instead of the unnatural final image of the subject shown in FIG. 6A.

When the image data modifier 54 modifies the image data based on the edge data, the edge data acquisition unit 52 for acquiring edge data obtains edge data in different degrees of extraction of the edge data based on the distance between the digital photographing apparatus and the main subject, which is determined by the range determiner 120. Accordingly, it is possible to obtain a final image with high sharpness by using the digital photographing apparatus according to an embodiment of the present invention when the digital photographing apparatus is far from the main subject. In addition, it is also possible to obtain a natural and smooth image by using the digital photographing apparatus according to an embodiment of the present invention when the digital photographing apparatus is close to the main subject.

Although the edge data acquisition unit 52 for acquiring edge data obtains edge data in a higher degree as the distance between the digital photographing apparatus and the main subject becomes larger, the edge data acquisition unit 52 for acquiring edge data may obtain edge data in a predetermined degree if the distance between the digital photographing apparatus and the main subject becomes larger than a predetermined distance. Further, although the edge data acquisition unit 52 for acquiring edge data obtains edge data in a lower degree as the distance between the digital photographing apparatus and the main subject becomes smaller, the edge data acquisition unit 52 for acquiring edge data may obtain edge data in a predetermined degree if the distance between the digital photographing apparatus and the main subject becomes smaller than a predetermined distance. Various modification may be applied to the present embodiment.

Figure 9:
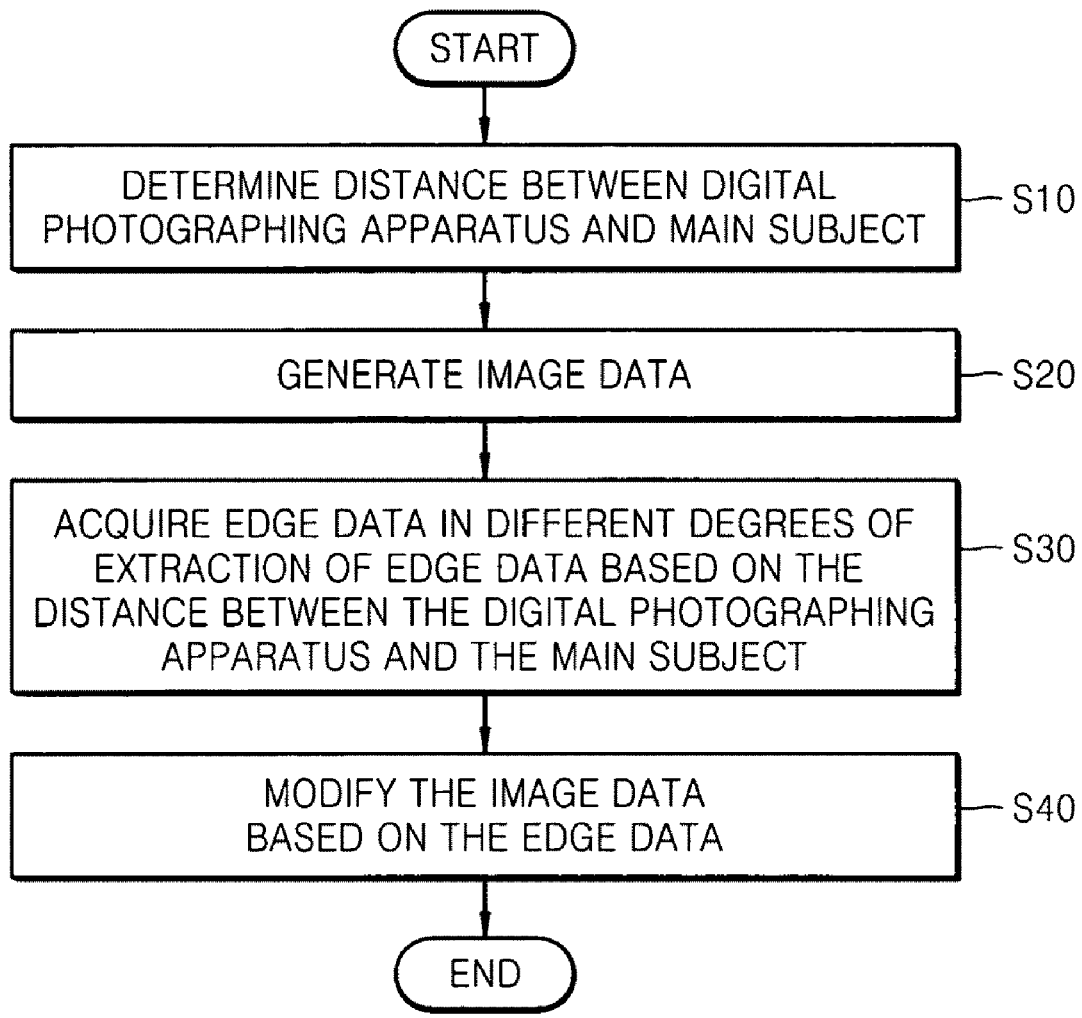
FIG. 9 is a flowchart of an example of a method of controlling a digital photographing apparatus according to another embodiment of the present invention.

FIG. 9 is a flowchart of an example of a method of controlling a digital photographing apparatus according to another embodiment of the present invention.

Referring to FIG. 9, an operation of determining a distance between the digital photographing apparatus and a main subject (operation S10) and an operation of generating image data from light incident on an image pickup element of the digital photographing apparatus (operation S20) are performed. The main subject indicates an object on which the digital photographing apparatus focuses. The operation of determining the distance between the digital photographing apparatus and the main subject (operation S10) may be performed by using autofocusing data of an autofocusing lens of the digital photographing apparatus or by using data from a range finder for measuring a distance between the digital photographing apparatus and the main subject, where the range finder is included in the digital photographing apparatus.

On the other hand, although the operation of generating the image data from the light incident on the image pickup element of the digital photographing apparatus (operation S20) is performed after the operation of determining the distance between the digital photographing apparatus and the main subject (operation S10) in FIG. 9, the operation of determining the distance between the digital photographing apparatus and the main subject (operation S10) may be performed after the operation of generating the image data from the light incident on the image pickup element of the digital photographing apparatus (operation S20). Alternatively, the operation of determining the distance between the digital photographing apparatus and the main subject (operation S10) and the operation of generating the image data from the light incident on the image pickup element of the digital photographing apparatus (operation S20) may be performed in parallel with each other. As can be appreciated by one skilled in the art, various changes in form and details may be made to this process. In this embodiment and other embodiments described herein, there is described a case where the operation of generating the image data from the light incident on the image pickup element of the digital photographing apparatus (operation S20) is performed after the operation of determining the distance between the digital photographing apparatus and the main subject (operation S10).

An operation obtaining edge data (operation S30) is performed after generating the image data. Specifically, edge data on edges of the subject is obtained from the image data in different degrees of extraction of the edge data based on the distance between the digital photographing apparatus and the main subject. For example, as described above, as the distance between the digital photographing apparatus and the main subject increases, the edge data may be obtained in a high degree of extraction of the edge data. The edge data may be obtained, so that the number of pixels corresponding to edges in the extracted edge data increases. The edge data may be obtained, so that the number of pixels with high luminance in the extracted edge data increases. The edge data may be obtained, so that pixels are recognized as edges, even though a luminance difference between neighboring pixels is small. The edge data may be obtained, so that pixels have high luminance in the extracted edge data, even though a luminance difference between neighboring pixels in the image data is small.

An operation of modifying the image data based on the edge data (operation S40) is performed after the operation of obtaining the edge data (operation S30). In this operation, data corresponding to the edge data included in the image data may be modified. Alternatively, the edge data may include luminance information. In operation S40, the luminance information of the edge data may be added to luminance information of the image data in regard to each pixel. In this case, when the value obtained by adding the luminance information of the edge data to the luminance information of the image data is equal to or less than a maximum luminance value, the luminance information of the image data is changed into the value obtained by adding the luminance information of the edge data to the luminance information of the image data. When the value obtained by adding the luminance information of the edge data to the luminance information of the image data is greater than the maximum luminance value, the luminance information of the image data is changed into the maximum luminance value.

Figure 10:
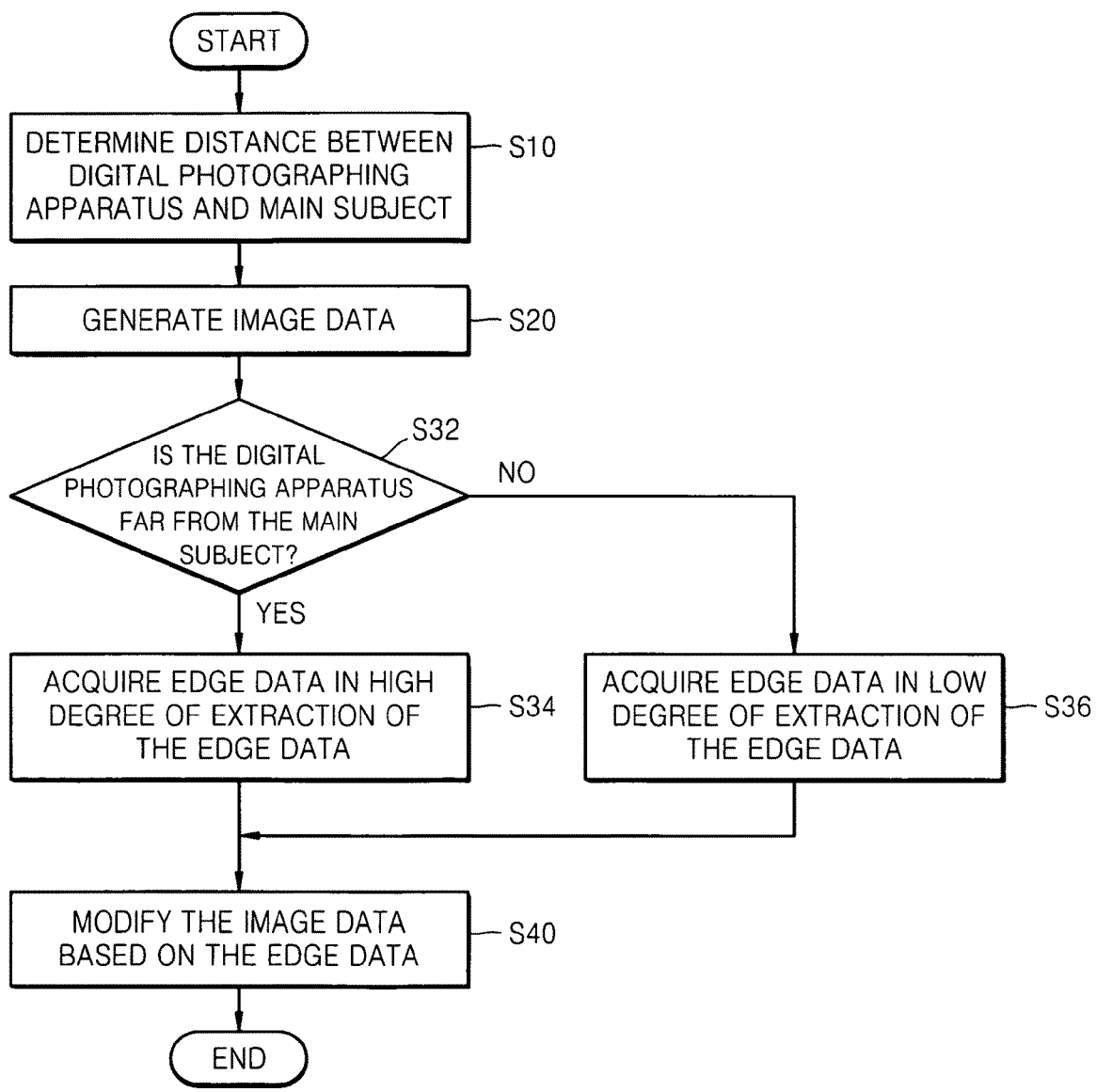
FIG. 10 is a flowchart of an example of a method of controlling a digital photographing apparatus according to another embodiment of the present invention.

FIG. 10 is a flowchart of an example of a method of controlling a digital photographing apparatus according to another embodiment of the present invention. The method of controlling the digital photographing apparatus according to the current embodiment is different from the aforementioned method, described with reference to FIG. 9, in terms of the procedure of obtaining edge data. As shown in FIG. 10, in the method of controlling the digital photographing apparatus according to the current embodiment, an operation of determining whether the digital photographing apparatus is far from the main subject (operation S32), an operation of obtaining edge data in a high degree of extraction of the edge data when the digital photographing apparatus is far from the main subject (operation S34), and an operation of obtaining edge data in a low degree of extraction of the edge data when the digital photographing apparatus is close to the main subject (operation S36) are performed. An operation of modifying image data based on the obtained edge data (operation S40) is performed.

FIG. 11 is a flowchart of an example of a method of controlling a digital photographing apparatus according to another embodiment of the present invention. The method of controlling the digital photographing apparatus according to the current embodiment is different from the aforementioned method, described with respect to FIG. 9 or 10, in terms of the procedure of obtaining edge data. As shown in FIG. 11, in the method of controlling the digital photographing apparatus according to the current embodiment, an operation of changing an edge filter based on the distance between the digital photographing apparatus and the main subject (operation S38) is performed. Then, an operation of obtaining edge data by using the changed edge filter (operation S39) is performed. The operation of changing the edge filter based on the distance between the digital photographing apparatus and the main subject may use the operations described with reference to Equations 1 and 2 or other various operations. In any of these cases, the extraction degree of the obtained edge data has only to be modified based on the distance between the digital photographing apparatus and the main subject.

In the method of controlling the digital photographing apparatus according to an embodiment of the present invention, in the case where the image data is modified based on the edge data, the edge data is obtained in different degrees of extraction of the edge data based on the distance between the digital photographing apparatus and the main subject. Accordingly, it is possible to obtain a final image with high sharpness by using the digital photographing apparatus according to an embodiment of the present invention, when the digital photographing apparatus is far from the main subject. In addition, it is also possible to obtain a natural and smooth image by using the digital photographing apparatus according to an embodiment of the present invention, when the digital photographing apparatus is close to the main subject.

A program for executing the method of controlling the digital photographing apparatus according to an embodiment of the present invention may be stored in a recording medium. The recording medium may be the storage medium 80 shown in FIG. 1, the memory 60 shown in FIG. 1, or another recording medium. Examples of the recording medium include a magnetic storage media (e.g., ROM, floppy disks, hard disks, etc.) and optical recording media (e.g., CD-ROMs, or digital versatile discs (DVDs)). The recording medium may be the CPU 100 of FIG. 1 or a part of the CPU 100.

While the present invention has been particularly shown and described with reference to exemplary embodiments thereof, it will be understood by those of ordinary skill in the art that various changes in form and details may be made therein without departing from the spirit and scope of the present invention as defined by the appended claims.

What is claimed is:

1. A method of controlling a digital photographing apparatus, the method comprising:
   (a) determining a distance between the digital photographing apparatus and a main subject;
   (b) generating image data from light incident on an image pickup element of the digital photographing apparatus;
   (c) obtaining edge data in different degrees of extraction of the edge data based on a distance between the digital photographing apparatus and the main subject, with the edge data being data on edges of a subject from the image data; and
   (d) modifying the image data based on the edge data.

2. The method of claim 1, wherein step (a) is performed by using autofocusing data of an autofocusing lens of the digital photographing apparatus.

3. The method of claim 1, wherein step (a) is performed by using data from a range finder for measuring the distance between the digital photographing apparatus and the main subject, wherein the range finder is attached to the digital photographing apparatus.

4. The method of claim 1, wherein in step (c), the edge data is obtained in a high degree of extraction of the edge data, as the distance between the digital photographing apparatus and the main subject increases.

5. The method of claim 1, wherein in step (c), the edge data is obtained, so that a number of pixels corresponding to the edges in the extracted edge data increases, as the distance between the digital photographing apparatus and the main subject increases.

6. The method of claim 1, wherein in step (c), the edge data is obtained, so that the number of pixels with high luminance in the extracted edge data increases, as the distance between the digital photographing apparatus and the main subject increases.

7. The method of claim 1, wherein in step (c), the edge data is obtained, so that pixels are recognized as the edges, even though a luminance difference between neighboring pixels is below a certain amount, as the distance between the digital photographing apparatus and the main subject increases.

8. The method of claim 1, wherein in step (c) the edge data is obtained, so that pixels have high luminance in the extracted edge data, even though a luminance difference between neighboring pixels in the image data is below a certain amount, as the distance between the digital photographing apparatus and the main subject increases.

9. The method of claim 1, wherein in step (d), data corresponding to the edges in the image data is modified.

10. The method of claim 9,
    wherein the edge data includes luminance information, and
    wherein in step (d), in regard to each pixel, the luminance information of the edge data is added to luminance information of the image data.

11. The method of claim 9,
    wherein the edge data includes luminance information, and
    wherein in regard to each pixel, step (d) comprises:
    (d-1) changing the luminance information of the image data into a value obtained by adding the luminance information of the edge data to the luminance information of the image data, when the value obtained by adding the luminance information of the edge data to the luminance information of the image data is equal to or less than a maximum luminance value; and
    (d-2) changing the luminance information of the image data into the maximum luminance value, when the value obtained by adding the luminance information of the edge data to the luminance information of the image data is greater than the maximum luminance value.

12. The method of claim 1, wherein the main subject is an object on which the digital photographing apparatus focuses.

13. A computer-readable recording medium having embodied thereon a computer program for executing the method of claim 1.

14. A digital photographing apparatus comprising:
    a range determiner for determining a distance between the digital photographing apparatus and a main subject;
    an image pickup element for generating image data from incident light;
    an edge data acquisition unit for obtaining edge data in different degrees of extraction of the edge data based on the distance between the digital photographing apparatus and the main subject which is determined by the range determiner, with the edge data being data on edges of a subject from the image data; and
    an image data modifier for modifying the image data based on the edge data obtained by the edge data acquisition unit.

15. The digital photographing apparatus of claim 14, wherein the range determiner determines the distance between the digital photographing apparatus and the main subject by using autofocusing data of an autofocusing lens of the digital photographing apparatus.

16. The digital photographing apparatus of claim 14 further comprising a range finder measuring the distance between the digital photographing apparatus and the main subject, wherein the range determiner determines the distance between the digital photographing apparatus and the main subject by using data from the range finder.

17. The digital photographing apparatus of claim 14, wherein the edge data acquisition unit obtains the edge data in a specified degree of extraction of the edge data or in a higher degree of extraction of the edge data than the specified degree of extraction of the edge data, as the distance between the digital photographing apparatus and the main subject increases.

18. The digital photographing apparatus of claim 14, wherein the edge data acquisition unit obtains the edge data, so that the number of pixels corresponding to the edges in the extracted edge data increases, as the distance between the digital photographing apparatus and the main subject increases.

19. The digital photographing apparatus of claim 14, wherein the edge data acquisition unit obtains the edge data, so that the number of pixels with luminance at a certain threshold in the extracted edge data increases, as the distance between the digital photographing apparatus and the main subject increases.

20. The digital photographing apparatus of claim 14, wherein the edge data acquisition unit obtains the edge data, so that pixels are recognized as the edges, even though a luminance difference between neighboring pixels is below a certain amount, as the distance between the digital photographing apparatus and the main subject increases.

21. The digital photographing apparatus of claim 14, wherein the edge data acquisition unit obtains the edge data, so that pixels have high luminance in the extracted edge data, even though a luminance difference between neighboring pixels in the image data is below a certain amount, as the distance between the digital photographing apparatus and the main subject increases.

22. The digital photographing apparatus of claim 14, wherein the image data modifier modifies data corresponding to the edges in the image data.

23. The digital photographing apparatus of claim 14, wherein the edge data includes luminance information, and wherein the image data modifier adds the luminance information of the edge data to luminance information of the image data, with regard to each pixel.

24. The digital photographing apparatus of claim 22, wherein the edge data includes luminance information, wherein in regard to each pixel, the image data modifier changes the luminance information of the image data into a value obtained by adding the luminance information of the edge data to the luminance information of the image data, when the value obtained by adding the luminance information of the edge data to the luminance information of the image data is equal to or less than a maximum luminance value, and wherein in regard to each pixel, the image data modifier changes the luminance information of the image data into the maximum luminance value, when the value obtained by adding the luminance information of the edge data to the luminance information of the image data is greater than the maximum luminance value.

25. The digital photographing apparatus of claim 14, wherein the main subject is an object on which the digital photographing apparatus focuses.

\* \* \* \* \*